US006756713B2

(12) United States Patent
Diehl et al.

(10) Patent No.: US 6,756,713 B2
(45) Date of Patent: Jun. 29, 2004

(54) INSULATED STATOR CORE WITH ATTACHMENT FEATURES

(75) Inventors: Kris D. Diehl, Berlin Center, OH (US); William E. Anstine, N. Canton, OH (US); Mark K. Dwyer, Burlington, NC (US)

(73) Assignee: Ametek, Inc., Kent, OH (US)

( * ) Notice: Subject to any disclaimer, the term of this patent is extended or adjusted under 35 U.S.C. 154(b) by 0 days.

(21) Appl. No.: 10/072,695

(22) Filed: Feb. 7, 2002

(65) Prior Publication Data

US 2003/0146671 A1 Aug. 7, 2003

(51) Int. Cl.[7] ................................................ H02K 1/12
(52) U.S. Cl. .......................... 310/71; 310/43; 310/254
(58) Field of Search ................................ 310/254, 258, 310/259, 42, 43, 71, 217, 216

(56) References Cited

U.S. PATENT DOCUMENTS

| 4,096,970 | A |   | 6/1978  | Wyatt ........................ 221/264 |
| 5,323,074 | A | * | 6/1994  | Sakashita et al. ............. 310/43 |
| 5,508,578 | A | * | 4/1996  | Suzuki et al. ................ 310/254 |
| 5,672,927 | A | * | 9/1997  | Viskochil .................... 310/194 |
| 5,825,108 | A |   | 10/1998 | De Filippis ................ 310/67 R |
| 6,058,593 | A |   | 5/2000  | Siess ........................... 29/596 |
| 6,069,421 | A |   | 5/2000  | Smith et al. .................. 310/43 |
| 6,075,304 | A |   | 6/2000  | Nakatsuka ................... 310/216 |
| 6,127,760 | A | * | 10/2000 | Nagasaki et al. ........... 310/254 |
| 6,175,168 | B1 |  | 1/2001  | Budd et al. .................... 310/12 |
| 6,534,888 | B1 | * | 3/2003 | Vorberg et al. ............... 310/91 |
| 2001/0045782 | A1 | | 11/2001 | Lieu et al. ................ 310/67 R |

* cited by examiner

Primary Examiner—Dang Le
(74) Attorney, Agent, or Firm—Renner, Kenner, Greive, Bobak, Taylor & Weber

(57) ABSTRACT

An encapsulated stator assembly includes a plurality of like laminations stacked in registration with one another. Each lamination contacts at least one adjacent lamination, but none of them are integrally connected in any way to any other lamination. A single covering layer partially encloses and maintains in registration the plurality of like laminations. At least one post with a deflectable head extends from the covering layer. A motor assembly having a rotor assembly coupled with the stator assembly partially encapsulated by a covering layer is mountable to a control circuit board by inserting the deflectable heads into an appropriate receptacle on the circuit board. The motor assembly is used to operate a fan assembly carried by a housing. The method of molding a covering layer over the plurality of laminations is also disclosed.

10 Claims, 4 Drawing Sheets

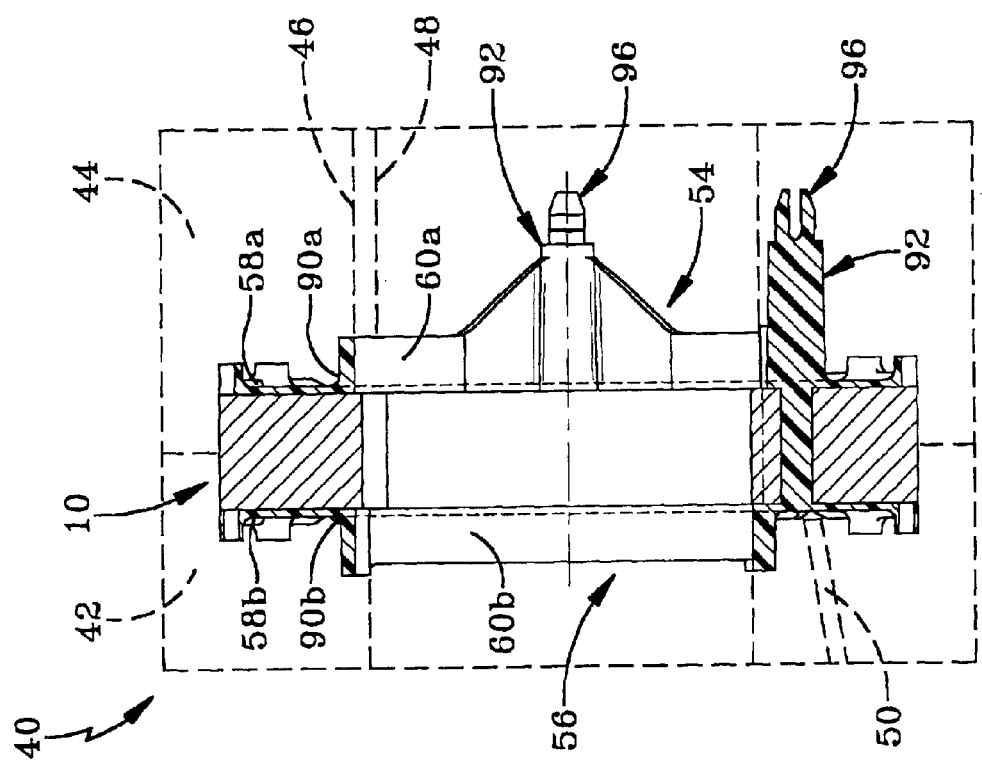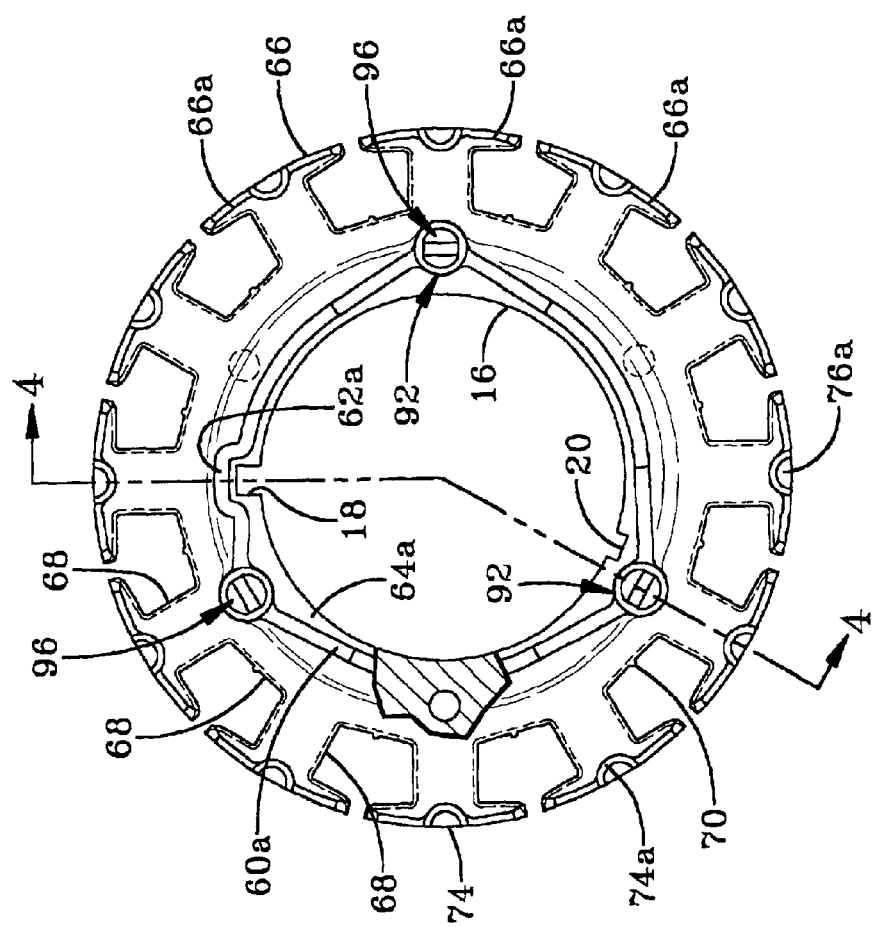

INSULATED STATOR CORE WITH ATTACHMENT FEATURES

TECHNICAL FIELD

The present invention is generally directed to stator cores used in motor assemblies. In particular, the present invention is related to an insulated stator core with improved electrical performance properties. Specifically, the present invention is related to an insulated stator core with attachment features.

BACKGROUND ART

Use of motor assemblies to rotate fans inside blowers is well known. To facilitate assembly of the blower assembly, the stator may be mounted directly to a circuit board. In particular, a completed stator assembly with windings is secured to the circuit board using threaded screws. Next, the windings are electrically connected to the circuit board which provides the ability to control the amount of electrical energy generated by the motor assembly. A rotor cup is then coupled to the stator assembly in a well known matter. When energized, the rotor turns a shaft which may have a fan connected thereto or the shaft may be used to drive some other piece of equipment.

The motor's operation is critical to the performance of the blower assembly. As such, a primary area of concern is the operation of the stator and how it is assembled. Currently, stators are made of a stack of steel laminations of a predetermined thickness. These laminations are precisely stacked and then secured to one another. This may be done by using rivet assemblies which extend through the stack and which may also function as stand-off posts for assembly to the circuit board. Alternatively, the stack may be welded in a well-known manner so that all the pieces are secured to one another. Stand-off posts may then be riveted, welded or otherwise fastened to the stack for assembly to the circuit board. In any event, after the stack laminations are secured to one another, the inner diameter and outer diameter of the laminations and the ends of the posts are masked off and an electrostatic epoxy powder is applied. The epoxy powder is then applied and cured so as to provide insulating features for the stator assembly prior to winding. The curing process takes about two hours.

One experienced in the art of motor assembly will realize several problems with the aforementioned stator assembly process. One significant problem is that the steel lamination stack may become skewed during assembly. As a result, the dimensional properties of the stack become distorted and the ability to wrap the required number of wire windings around the different poles of the stack is hampered. In particular, if the stack is skewed the windings will not fit between the stator teeth. And if a maximum number windings are not obtained the motor's performance is severely diminished. In addition to taking a long time to cure the epoxy material, the cured epoxy may provide inadequate coverage which results in electrical "creepage" between the windings and the exposed areas of the stator. This electrical creepage may reduce motor life and otherwise adversely effect motor performance. The epoxy curing process is also problematic inasmuch as the epoxy powder may have pin holes or may collect dust during the curing process and result in poor insulating properties for the motor assembly. Moreover, the applying of epoxy powder may result in thin areas which tend to flake after curing which also leads to shorting problems. The epoxy powder must be delivered in a refrigerated truck and stored at a temperature of 75° F. or below to prevent deterioration. It must also be stored in a moisture-free environment for proper flow and adhesion. Running the epoxy coating machine in humid climate conditions causes the epoxy powder to cake, thus causing the machine to jam, creating expensive down time.

It has been recognized that the aforementioned shortcomings reduce the quality of the stator assembly and, as such, the overall quality of the motor assembly is not what it could be. Nor does the current manufacturing process lend itself to high quality assemblies. Several attempts have been made to overcome the quality problems by applying more epoxy material to the desired areas. However, the thickness of the epoxy material cannot be uniformly controlled and it also reduces the number of windings that can be wound around the stator core. Another attempt to overcome such problems includes the use of a two piece insulator wherein one piece covers a portion of the stator assembly and the second piece covers the remaining portions. However, these insulators have been found to significantly narrow the winding gap so as to diminish the ability of the stator to perform its desired function. Moreover, the two piece insulator devices are very expensive to tool and to assemble. And, if the two piece insulators are misaligned during assembly, the aforementioned creepage problems arise.

Therefore, there is a need in the art to provide an insulated stator assembly which has improved electrical performance properties and reliability. There is also a desire in the art to improve the manufacturing process of the stator assembly and to provide the stator with features that otherwise enhance the overall assembly process of the motor assembly.

SUMMARY OF THE INVENTION

Therefore, it is a first aspect of the present invention to provide an insulated stator core with attachment features.

Another object of the present invention, which shall become apparent as the detailed description proceeds, is achieved by an encapsulated stator assembly, comprising a plurality of like laminations stacked in registration with one another, each lamination contacting at least one adjacent lamination, but laminations are not integrally connected in any way to any other lamination; and a single covering layer partially enclosing and maintaining in registration the plurality of like laminations.

Other aspects of the present invention are attained by a blower assembly, comprising a housing having an inlet and an outlet; a fan assembly carried in the housing for drawing air into the inlet and exhausting the air out the outlet; a control circuit board carried by the housing; and a motor assembly for operating the fan assembly, the motor assembly having a rotor assembly coupled with a stator assembly that is partially encapsulated by a covering layer, the covering layer having at least one post extending therefrom that is mountable to the control circuit board.

Still another object of the present invention is attained by a method for manufacturing an insulated stator, comprising: providing a pair of mold halves with a keyed mandrel extending through the halves when closed; stacking a plurality of laminations in registration with each other, but unsecured to one another into the mold halves and onto the keyed mandrel; closing the mold halves onto the plurality of laminations; injecting a polymeric material into the mold halves to dispose a covering layer about the plurality of laminations so as to secure the plurality of laminations to one in another while maintaining their registration with one another; and opening the mold halves and ejecting the plurality of laminations with the covering layer.

These and other objects of the present invention, as well as the advantages thereof over existing prior art forms, which will become apparent from the description to follow, are accomplished by the improvements hereinafter described and claimed.

BRIEF DESCRIPTION OF THE DRAWINGS

For a complete understanding of the objects, techniques and structure of the invention, reference should be made to the following detailed description and accompanying drawings, wherein:

FIG. 3 is a plan view of the stator assembly partially broken away;

FIG. 4 is an elevational view of a mold used to form the insulated stator assembly taken along lines 4—4 of FIG. 3 and showing the stator assembly in a cross-sectional view;

BEST MODE FOR CARRYING OUT THE INVENTION

Figure 1:
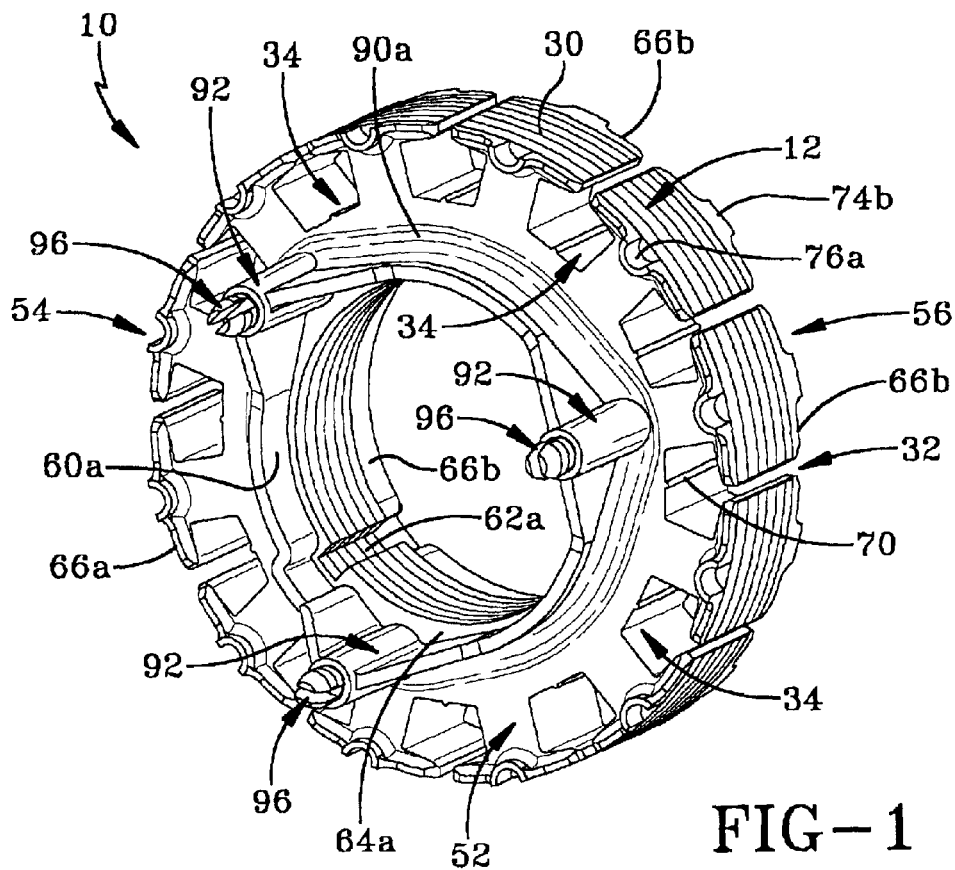
FIG. 1 is a perspective view of an encapsulated stator assembly according to the present invention.
Figure 2:
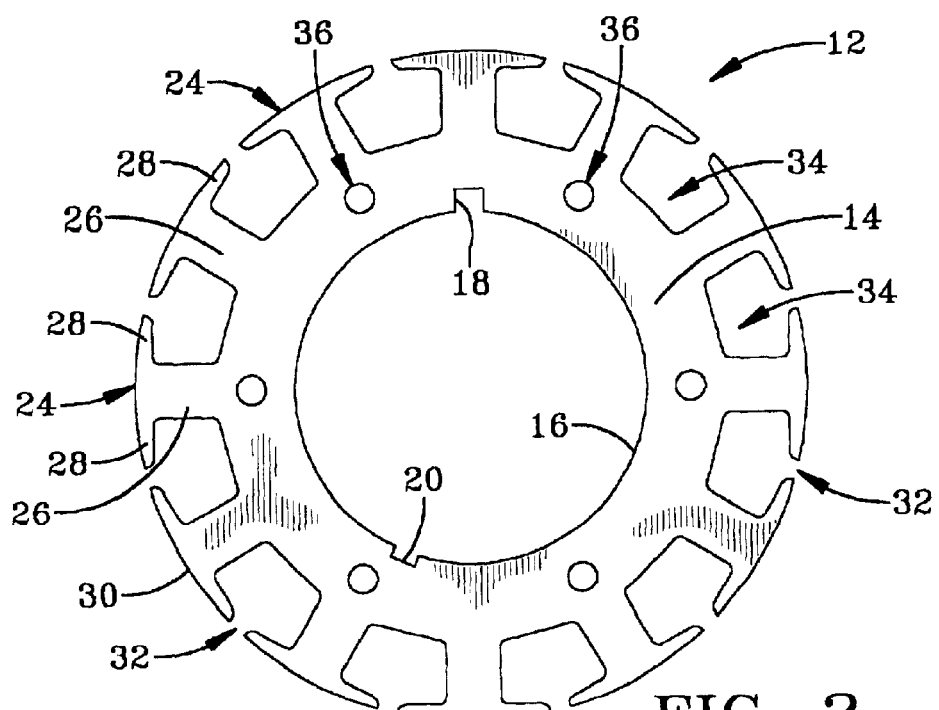
FIG. 2 is a plan view of a lamination stamping.

Referring now to the drawings and in particular to FIGS. 1 and 2 it can be seen that an insulated stator assembly is designated generally by the numeral 10. The stator assembly is made up of a plurality of laminations—about 26 in the preferred embodiment—one of which is generally designated by the numeral 12. A lamination 12 includes a stamping 14 that is preferably made of about 26 gauge steel. The stamping 14 has an inner diameter 16 that later accommodates a hub on a blower bracket which houses a bearing system of the blower assembly. Extending radially outwardly from the inner diameter 16 is an alignment key 18 and an alignment key 20. Although the preferred embodiment employs two alignment keys it will be appreciated that only one key may be used. Moreover, the alignment keys may be inwardly extending if desired. Each stamping 14 includes a plurality of teeth 24 that extend radially outwardly from the stamping 14. Each tooth 24 includes a bar 26 that has at its distal end outer edge projections 28 which extend from both sides thereof. The outer edge projections 28 collectively form an outer diameter 30 such that the stamping 14 has a circular configuration. Adjacent outer edge projections 28 form a gap 32 therebetween which is wide enough to allow for later receipt of wires in the coil winding operation but which are small enough to provide optimal electrical properties for the stator. Adjacent bars 26 along with their respective adjacent outer edge projections 28 form a winding cavity 34 so as to allow for accumulation of the wires used as the motor windings. Each stamping 14 has a plurality of flow holes 36 disposed about an inner periphery thereof.

Referring now to FIGS. 3 and 4, the formation of the insulated stator assembly 10 will be described in detailed. In FIG. 4 it can be seen that a mold 40 is employed in the formation of the stator assembly 10. In particular, the mold 40 includes a first half 42 that is mateable with a second half 44. A mandrel 46 extends through the mold halves 42, 44 when they are mated with one another. The mandrel 46 includes alignment ribs 46 and 48 that correspond to the keys 18 and 20 provided in each stamping 14. Of course, if only one alignment key is provided, then only one alignment rib will be needed. One or both of the mold halves 42, 44 may be provided with gates 50 that allow for injecting polymeric material into the mold after it is closed.

In forming the stator assembly 10 loose, unsecured individual stampings 14 are stacked onto the mandrel 46 such that the alignment keys 18, 20 align with the appropriate ribs 46 and 48 on the mandrel 46. Once the appropriate height of the stampings 14 is obtained, the mold halves 42, 44 are closed so as to seal around selected surfaces of the stampings 14. A polymeric material is injected through the gates 50 and surrounds the stampings 14. Preferably, the molding material is a nylon material DuPont Zytel™ 70G13L. This material is selected for its electrical properties and for its compatibility with molding around the steel laminations. Of course, similar molding materials could be used. The mold halves 42, 44 are constructed so that the gates 50 are aligned with the flow holes 36 to allow for the material to flow through and cover both ends of the stator assembly 10. After the injection molding material has set, the mold halves are opened and the insulated stator assembly 10 is ejected from the mold.

The injection molding material forms a molded covering layer 52 that is selectively disposed around the stack of stampings 14. The covering layer is formed so that it secures the laminations to one another in such a way that the need for pre-connection of the stampings 14 is not required. In other words, the need to provide rivets through the stampings or a weld to secure the stampings to one another is not required with the aforementioned process.

As seen in FIGS. 1, 3 and 4, the stator assembly 10 has two ends, one of which is designated as a post end 54 and the other as a top end 56. Both ends 54 and 56 may have common features. As seen in the drawings, the post end 54 common features have an "a" suffix while the common features on the top end 56 have a "b" suffix. Each end 54 and 56 has a face surface 58 that has a thickness of about 0.017 inches plus or minus 0.001 inches of the molding material. Safety agencies require an insulation material thickness of at least 0.014 inches between the windings and the laminations and as such this thickness adequately meets that agency requirement while still providing the necessary room for the later-applied motor windings. Each end 54, 56 has a collar 60 that extends axially and has a slightly larger outer diameter than the inner diameter 16 of the stampings 14. It will be appreciated that the collar 60 could be flush with the inner diameter of the stampings and that it could follow the complete contour of the inner diameter including accommodations for the keys 18, 20. In the present embodiment, the collar 60a, b has at least a key wall 62 that conforms to the shape of the keys 18. In any event, a ledge 64 may be formed between the stamping 14 that is at the end of each stack and the collar 60. The ledge 64 functions as a sealing surface for the mold halves 42, 44. The face surfaces 58a, b extend over the bars 26 and radially and axially enclose the bars and the interior surfaces of the outer edge projections 28. In other words, the face surfaces 58 extend from the collar 60 to the extreme radial edge or outer periphery of the outer projections 28.

Figure 5:
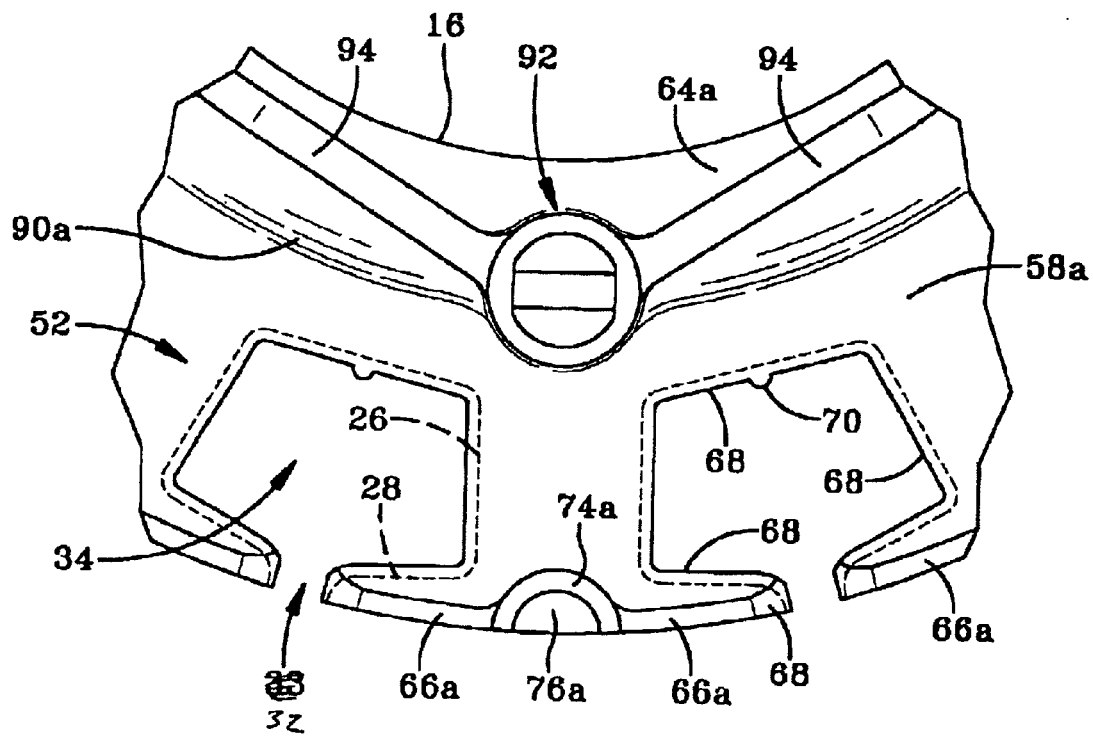
FIG. 5 is an exploded view of one tooth of the insulated stator assembly according to the present invention.

Extending axially from the outer periphery of each outer projection 28 is a creepage wall 66. It will be appreciated that the creepage walls 66 could also be radially extending as well. In the preferred embodiment, the creepage walls 66 are flush with the outer diameter of the stampings 14 which are exposed to allow interface with the rotor assembly of the motor. It will also be appreciated that the creepage walls 66 and surfaces 58 form a gap wall 68 that covers all of the surfaces of the teeth 24 except for the outer diameters of the stampings which are used as another sealing surface for the mold 40. The details of the creepage walls 66 are best seen in FIG. 5. The gap walls 68 also provide a nib 70 which is aligned substantially opposite the gap 32. The nibs function to allow for the enhanced flow of polymeric material around the stampings 14 without impeding the later application of the motor winding wires. Integrally formed with each creepage wall 66 is a tooth nub 74. The tooth nubs 74 extend axially from the faces 58 and are centrally located between the ends of the projections for each bar. The height of the tooth nubs 74 is preferably higher than the creepage walls 66 and provides for additional material to insure that there is no electrical creepage between the motor windings and the outer diameters of the laminations 12. The tooth nubs 74 are semi-circular in construction although other geometrical shapes could be used. The tooth nubs 74 provide a nub face 76 which exposes an outer surface of the stamping 14 at the end of each stack and also provides another sealing surface for the mold 40.

Additional features which may be provided by the molded assembly include a radius 90 that is formed between respective faces 58 and collars 60. The radius 90 facilitates termination of the windings as the end of each winding is laced underneath a group of the windings. The radius wall assists in deflecting the end of the wire axially so that it can be properly terminated. Extending axially from the face 58a and in particular from the collar 60a are a plurality of posts 92. Although in the preferred embodiment three posts are shown, it will be appreciated that one or any number of posts could be used for the present assembly. The posts 92 extend from the collar 60a and are supported by a buttress 94 that extends from at least two sides of the post and are contiguous with the collar 60a.

Figure 6:
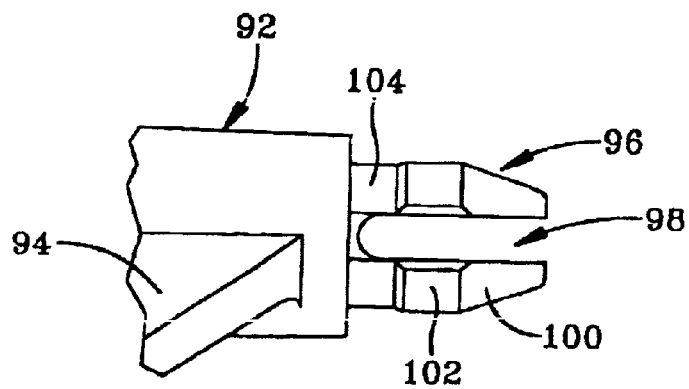
FIG. 6 is an exploded view of a deflectable post head that extends from the insulated stator assembly.

As best seen in FIG. 6, each post 92 has a head 96 at its distal end with a slot 98 therethrough. Each head 96 provides a shoulder 100 that is tapered outwardly from its top edge and forms an annular rib 102. An annular groove 104 is formed inwardly from the rib 102. As such, it will be appreciated that the post head 96 is deflectable in nature such that when it is inserted into a circuit board with a hole therethrough, the shoulders 100 are compressed inwardly by virtue of the slot 98. Accordingly, the shoulders 100 and ribs 102 are compressed inwardly as the post head 96 is inserted through the board and then as the head 96 clears the thickness of the board material the shoulder 100 and the rib 102 expand outwardly such that the grooves 104 are engaged by the circuit board or similar mounting device into which the post has been inserted.

Figure 7:
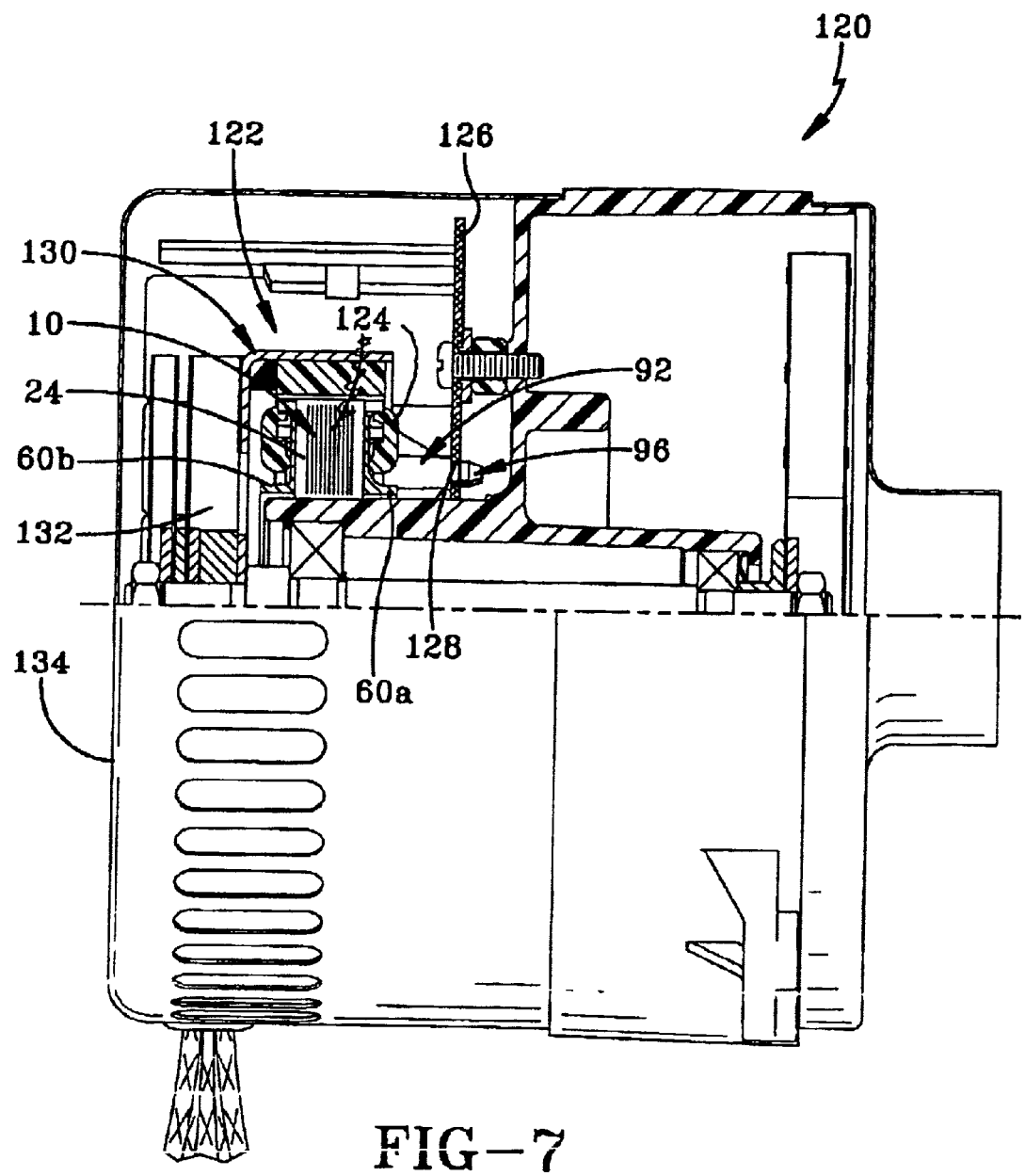
FIG. 7 is an assembly drawing of a blower assembly which employs the insulated stator assembly according to the present invention.

Referring now to FIG. 7 it can be seen that a completed motor assembly is designated generally by the numeral 120. The motor assembly 120 includes a stator assembly 122. The stator assembly 122 includes the previously described encapsulated stator 10 and windings 124 wound around the teeth 24 in a manner well known in the art. Particular features of the stator assembly 10 are utilized to enhance the winding process. In particular, the collars 60a, b are employed to provide a guide to the individual assembling the windings to insure that the windings do not extend too high. Moreover, the radius 90 provided between the faces 58 and the adjacent collars 60 allow for threading the winding ends in such a manner that the assembly process is enhanced. And by using a molded assembly process, the creepage walls significantly preclude the arcing of the windings to the outer diameter or exposed surfaces of the lamination stampings. In any event, the motor assembly 120 includes a circuit board 126 which includes mounting receptacles 128. In the preferred embodiment, the mounting receptacles are simply holes that allow for receipt of the deflectable post heads 96. Accordingly, the completed stator assembly 122 is aligned and snapped into the circuit board in a simple manufacturing process. This is in distinct contrast to the prior art where fasteners of some type were required to be inserted into threaded posts that were previously riveted, or otherwise secured to the completed stator assembly. Next, a rotor assembly 130 is coupled to the stator assembly 122. Attached to the rotor assembly 130 is a fan 132 which is enclosed in a housing 134 which has an inlet and an outlet for moving air. This completed assembly 120 is then ready for use once the windings and other connections are made to the circuit board 126.

From the foregoing description and methodology of assembling the motor assembly 120 and the method of manufacturing the stator assembly 10 it is readily apparent to those skilled in the art that numerous advantages are realized. One of the primary advantages of the present invention is that the stator assembly does not require preconnection of the laminations to one another. In addition to completely eliminating the manufacturing step of riveting or welding the laminations stacked to one another, the keys employed in the mold allow for virtually perfect registration of the laminations with respect to one another. This insures that maximum room is available for the wire as it is wound about the insulated stator 10. Use of a molding material insures uniform and complete insulation of the stator and the appropriate dimensions. Accordingly, there is no flaking of material and with a uniform layer of approximately 0.017 inches, the variations that are typical with using an epoxy powder are completely eliminated. And the associated costs for maintaining an epoxy molding operation are eliminated. Morever, the molding material used has vastly improved electrical insulation properties and it has been found that the voltage breakdown is significantly improved. For example, the agency requirement for insulated stator voltage breakdown is approximately 1800 volts for one second on 240 volt blowers. Although the use of an epoxy material provides a voltage breakdown of about 2400 volts it has been found that using the nylon material provides a voltage breakdown of about 4000 volts. Accordingly, the motor life and the quality thereof is significantly improved by the aforementioned process. It is believed that this new process will significantly reduce manufacturing rejections, manufacturing labor, save costs—about $1.00 per part—and improve the overall quality of the insulated stator assembly 10.

Thus, it can be seen that the objects of the invention have been satisfied by the structure and its method for use presented above. While in accordance with the Patent Statutes, only the best mode and preferred embodiment has been presented and described in detail, it is to be understood that the invention is not limited thereto or thereby. Accordingly, for an appreciation of the true scope and breadth of the invention, reference should be made to the following claims.

What is claimed is:

1. An encapsulated stator assembly, comprising:
   a plurality of like laminations stacked in registration with one another, each said lamination contacting at least one adjacent lamination, but said laminations not integrally connected in any way to any other lamination;
   a single covering layer partially enclosing and maintaining in registration said plurality of like laminations;

at least one stand-off post extending from said layer; and a deflectable head extending from said stand-off post and receivable in an appropriate receptacle, wherein said deflectable head has a tapered shoulder that extends to an annular rib that forms a groove, said tapered shoulder and said annular rib having a slot therethrough to allow inward compression of said shoulder and said rib when inserted into said appropriate receptacle that fits into said groove.

2. The assembly according to claim 1, wherein each said lamination comprises a stamping, said stamping having an inner diameter with two alignment features, and a plurality of teeth extending radially outwardly from said stamping.

3. The assembly according to claim 2, wherein said layer comprises at least one collar axially extending therefrom and proximally aligned with said inner diameter.

4. The assembly according to claim 3, further comprising:

a radial transition between said collar and said layer, said radial transition facing away from said inner diameter.

5. The assembly according to claim 2 wherein said layer comprises a creepage wall extending from an outer periphery of said layer.

6. The assembly according to claim 5 wherein each of said plurality of teeth has an edge projection that collectively form an outer diameter with gaps disposed therebetween and wherein said outer diameter is substantially flush with said creepage wall.

7. The assembly according to claim 6, wherein said layer further comprises a tooth nub extending axially from said creepage wall at each said edge projection.

8. The assembly according to claim 7 wherein said edge projections that collectively form an outer diameter, and wherein said tooth nubs project radially inwardly to expose a surface of the lamination that is at the end of said lamination stack.

9. An encapsulated stator assembly, comprising:

a plurality of like laminations stacked in registration with one another, each said lamination contacting at least one adjacent lamination, but said laminations not integrally connected in any way to any other lamination;

a single covering layer partially enclosing and maintaining in registration said plurality of like laminations;

a creepage wall extending from an outer periphery of said layer;

a tooth nub extending axially from said creepage wall at each said edge projection; and wherein said edge projections that collectively form an outer diameter, and wherein said tooth nubs project radially inwardly to expose a surface of the lamination that is at the end of said lamination stack.

10. The assembly according to claim 9 further comprising:

at least one stand-off post extending from said layer; and a deflectable head extending from said stand-off post and receivable in an appropriate receptacle, wherein said deflectable head has a tapered shoulder that extends to an annular rib that forms a groove, said tapered shoulder and said annular rib having a slot therethrough to allow inward compression of said shoulder and said rib when inserted into said appropriate receptacle that fits into said groove.

* * * * *